US008728581B2

(12) United States Patent
Fowler

(10) Patent No.: US 8,728,581 B2
(45) Date of Patent: May 20, 2014

(54) EMBOSSED CARPET BACKING

(75) Inventor: Gregory D. Fowler, Rocky Face, GA (US)

(73) Assignee: Columbia Insurance Company, Omaha, NE (US)

( * ) Notice: Subject to any disclaimer, the term of this patent is extended or adjusted under 35 U.S.C. 154(b) by 242 days.

(21) Appl. No.: 12/839,058

(22) Filed: Jul. 19, 2010

(65) Prior Publication Data

US 2011/0014431 A1    Jan. 20, 2011

Related U.S. Application Data

(60) Provisional application No. 61/226,575, filed on Jul. 17, 2009, provisional application No. 61/227,342, filed on Jul. 21, 2009.

(51) Int. Cl.
*B05D 3/02* (2006.01)

(52) U.S. Cl.
USPC ........... 427/373; 427/244; 427/355; 427/371; 427/372.2; 427/375; 427/379; 427/381; 427/384; 427/385.5; 427/389.9; 427/394; 428/95; 428/172; 428/304.4; 442/221

(58) Field of Classification Search
None
See application file for complete search history.

(56) References Cited

U.S. PATENT DOCUMENTS

| 3,649,325 A | 3/1972 | Affeldt | 428/96 |
|---|---|---|---|
| 3,661,691 A | 5/1972 | Slosberg | 428/95 |
| 3,821,130 A | 6/1974 | Barron | 521/133 |
| 3,849,158 A | 11/1974 | Palmer | 8/497 |
| 3,849,159 A | 11/1974 | Palmer | 8/497 |
| 3,862,879 A | 1/1975 | Barron | 428/95 |
| 3,870,583 A | 3/1975 | Gidge | 156/500 |
| 3,926,700 A | 12/1975 | Hopkins | 428/95 |
| 4,010,301 A | 3/1977 | Anderson | 428/95 |
| 4,010,302 A | 3/1977 | Anderson | 428/95 |
| 4,035,529 A | 7/1977 | Meisert | 427/244 |
| 4,278,482 A * | 7/1981 | Poteet et al. | 156/78 |
| 4,374,209 A | 2/1983 | Rowlands | 521/116 |
| 4,412,877 A | 11/1983 | Vosburgh | 156/72 |
| 4,443,505 A | 4/1984 | Ehrenfeld, Jr. | 428/89 |

(Continued)

FOREIGN PATENT DOCUMENTS

| CA | 2743930 | 5/2010 |
|---|---|---|
| EP | 327749 | 8/1989 |
| WO | WO 03/028997 | 4/2003 |
| WO | WO 2010/056250 | 5/2010 |

OTHER PUBLICATIONS

Saunders & Frisch. "Polyurethanes, Chemistry, and Technology" in High Polymers, vol. XVI. Interscience Publishers, New York; vol. I, pp. 32-42, 44-54 (1962) and vol. II, pp. 5-6, 198-199 (1964).

(Continued)

*Primary Examiner* — Timothy Meeks
*Assistant Examiner* — Michael P Rodriguez
(74) *Attorney, Agent, or Firm* — Ballard Spahr LLP

(57) ABSTRACT

Disclosed is a floor covering having an embossed polyurethane foam backing layer and methods of making and using same. A bottom surface of the backing layer can be thermoembossed with a predetermined pattern, and the bottom surface of the backing layer can define at least one fluid pathway in communication with a side edge of the floor covering. The floor covering can also have a layer of skid-resistant material connected to the bottom surface of the backing layer.

23 Claims, 4 Drawing Sheets

(56) References Cited

U.S. PATENT DOCUMENTS

| | | | |
|---|---|---|---|
| 4,988,551 A | 1/1991 | Zegler | 428/40 |
| 5,030,497 A | 7/1991 | Claessen | 428/95 |
| 5,045,375 A * | 9/1991 | Davis et al. | 428/96 |
| 5,104,693 A | 4/1992 | Jenkines | 427/244 |
| 5,198,277 A | 3/1993 | Hamilton | 428/92 |
| 5,204,155 A | 4/1993 | Bell | 428/95 |
| 5,567,497 A * | 10/1996 | Zegler et al. | 428/95 |
| 5,763,039 A | 6/1998 | Staubs | 428/95 |
| 5,902,663 A | 5/1999 | Justesen | 428/95 |
| 5,925,434 A | 7/1999 | Phillips | 428/95 |
| 6,060,145 A | 5/2000 | Smith | 428/95 |
| 6,096,401 A | 8/2000 | Jenkines | 428/95 |
| 6,344,254 B1 | 2/2002 | Smith | 428/95 |
| 6,372,810 B2 | 4/2002 | Kazmierski | 521/130 |
| 6,555,199 B1 | 4/2003 | Jenkines | 428/97 |
| 6,838,147 B2 | 1/2005 | Burns, Jr. | 428/95 |
| 2003/0041945 A1 | 3/2003 | McDonald | 52/746.1 |
| 2003/0161990 A1 | 8/2003 | Higgins | 428/85 |
| 2003/0170420 A1 | 9/2003 | Higgins | 428/85 |
| 2003/0211292 A1* | 11/2003 | Malone et al. | 428/182 |
| 2004/0022994 A1 | 2/2004 | Higgins | 428/85 |
| 2006/0165949 A1 | 7/2006 | Segars | 428/85 |
| 2007/0095453 A1 | 5/2007 | Brumbelow | 156/77 |
| 2007/0275207 A1* | 11/2007 | Higgins et al. | 428/95 |
| 2007/0275209 A1* | 11/2007 | Netravali et al. | 428/99 |
| 2007/0286982 A1 | 12/2007 | Higgins | 427/369 |
| 2008/0085391 A1 | 4/2008 | Streeton | 442/59 |
| 2009/0029097 A1 | 1/2009 | Riddle | 428/85 |
| 2009/0130373 A1 | 5/2009 | Sharir | 15/215 |
| 2010/0267304 A1 | 10/2010 | Fowler | 428/181 |

OTHER PUBLICATIONS

Saunders KJ, et al. Organic Polymer Chemistry, pp. 323-325 (1973).

3M Safety-Walk Wet Area Matting 3200. Stock No. 61500057528, UPC: 0-48011-13723-5, downloaded from http://www.shop3m.com/61500057528.html on Jun. 22, 2012 (2 pages).

Non-Final Rejection mailed Jul. 24, 2012 by the U.S. Appl. No. 12/619,059, filed Nov. 16, 2009 (1st Named Inventor—Fowler) (8 pages).

Response to Requirement for Restriction/Election filed Jun. 7, 2012 with the U.S. Appl. No. 12/619,059, filed Nov. 16, 2009 (1st Named Inventor—Fowler) (3 pages).

Requirement for Restriction/Election mailed Feb. 7, 2012 by the U.S. Appl. No. 12/619,059, filed Nov. 16, 2009 (1st Named Inventor—Fowler) (8 pages).

International Search Report issued Jan. 7, 2009 by the International Searching Authority for application PCT/US08/083689 filed on Nov. 14, 2008 (Applicant—Shaw Industries Group // 1st Named Inventor—Fowler) (1 page).

Written Opinion issued Jan. 7, 2009 by the International Searching Authority for application PCT/US08/083689 filed on Nov. 14, 2008 (Applicant—Shaw Industries Group // 1st Named Inventor—Fowler) (5 pages).

International Preliminary Report on Patentability issued May 17, 2011 by the International Bureau for application PCT/US08/083689 filed on Nov. 14, 2008 (Applicant—Shaw Industries Group // 1st Named Inventor—Fowler) (6 pages).

* cited by examiner

EMBOSSED CARPET BACKING

CROSS-REFERENCE TO RELATED APPLICATIONS

This application claims the benefit of priority to U.S. Provisional Patent Application Ser. Nos. 61/226,575, filed on Jul. 17, 2009, and 61/227,342, filed on Jul. 21, 2009, the entire disclosures of which are incorporated by reference herein for all purposes.

FIELD OF THE INVENTION

The present invention relates generally to floor coverings having cured polyurethane foam backing layers. More specifically, the cured polyurethane foam backing layers can be thermo-embossed with a predetermined pattern. Also provided are methods for providing the floor coverings and the cured embossed polyurethane foam backing layers.

BACKGROUND OF THE INVENTION

A backing material can be used with a carpet or textile to provide a support, a cushion, a contamination barrier, a moisture barrier, or to simplify installation of the carpet or textile. Backing or support layers often comprise a polyurethane foam. Typically, these polyurethane foams are intermediately positioned within multi-layered backing materials and do not have any exposed external surfaces. Therefore, other textile materials are typically used in the outermost layer of the backing material. However, these textile materials are often not an ideal source for the outermost backing layer of floor coverings that will be exposed to certain external environments, including marine environments or other environments where the floor covering will encounter moisture. In addition, the outermost backing layers of floor coverings cannot typically be embossed in a pattern that is fully effective to disperse moisture away from the floor covering. Further, floor coverings typically have a face layer and multiple backing layers, and this multi-layered configuration can increase the cost of the floor covering.

Accordingly, there is a need to provide methods for producing floor coverings and backing materials with embossed polyurethane foam compositions that are embossed with predetermined patterns for dispersing fluids away from the floor coverings and backing materials. Additionally, there is a need to provide a cost-efficient floor covering comprising a greige good and a cured embossed polyurethane foam backing. Further, there is a need to provide a floor covering having skid-resistant properties in marine environments. These needs and other needs are at least partially satisfied by the present invention.

SUMMARY

Disclosed are floor coverings and floor backings and methods of making and using same. Generally, the floor covering has a greige good having a face surface and a back surface. In one aspect, a backing layer is provided that can be made from cured embossed polyurethane foam. In this aspect, the backing layer has a top surface that can connect to the back surface of the greige good. In a further aspect, a bottom surface of the backing layer can be thermo-embossed with a pre-determined pattern and can define at least one fluid pathway in communication with a side edge of the floor covering. In various aspects, it is contemplated that the polyurethane foam is formed from a mechanically frothed, chemically blown, or mechanically frothed/chemically blown polyurethane composition.

Also disclosed are methods for making the floor coverings. Generally, the floor coverings can be made by providing a greige good and applying the foamable polyurethane composition to a selected surface of the greige good. In one aspect, the applied polyurethane composition can be metered to form a substantially uniform layer of the foamable polyurethane composition having a predetermined thickness. Subsequently, the foamable polyurethane composition can be partially cured and embossed with a predetermined pattern. After embossing, the polyurethane composition can then be completely cured to provide a floor covering.

Additional embodiments of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION OF THE FIGURES

These and other features of the preferred embodiments of the invention will become more apparent in the detailed description in which reference is made to the appended drawings wherein.

DETAILED DESCRIPTION OF THE INVENTION

Figure 1:
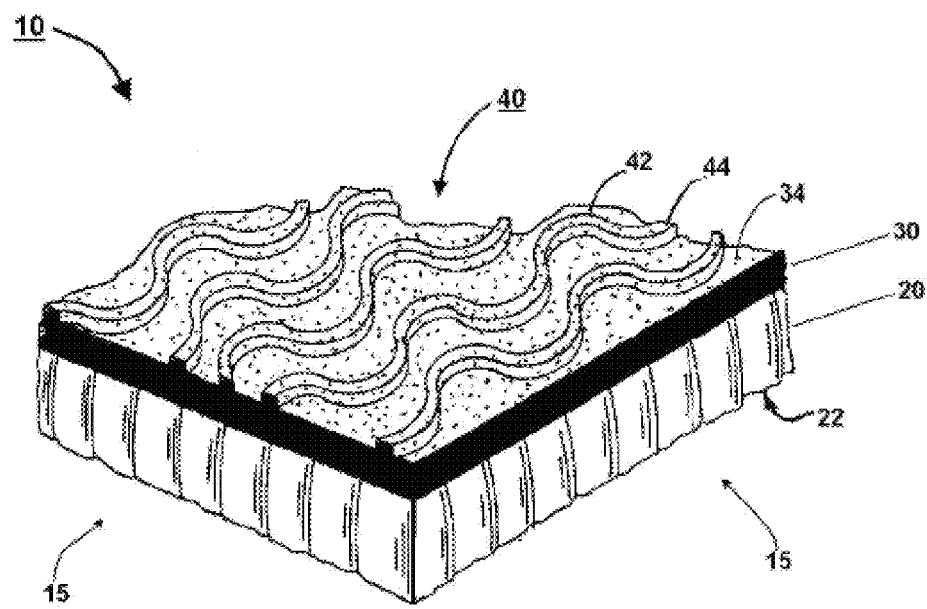
FIG. 1 depicts a side perspective view of a portion of a floor covering having an embossed carpet backing as described herein.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "surface" includes aspects having two or more such surfaces unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein, and unless the context clearly indicates otherwise, the term "carpet" is used to generically include broadloom carpet, carpet tiles, and even area rugs. To that end, "broadloom carpet" means a broadloom textile flooring product manufactured for and intended to be used in roll form. "Carpet tile" denotes a modular floor covering, conventionally in 18"×18," 24"×24" or 36"×36" squares, but other sizes and shapes are also within the scope of the present invention.

The present invention may be understood more readily by reference to the following detailed description of preferred embodiments of the invention and the examples included therein and to the Figures and their previous and following description.

Figure 2:
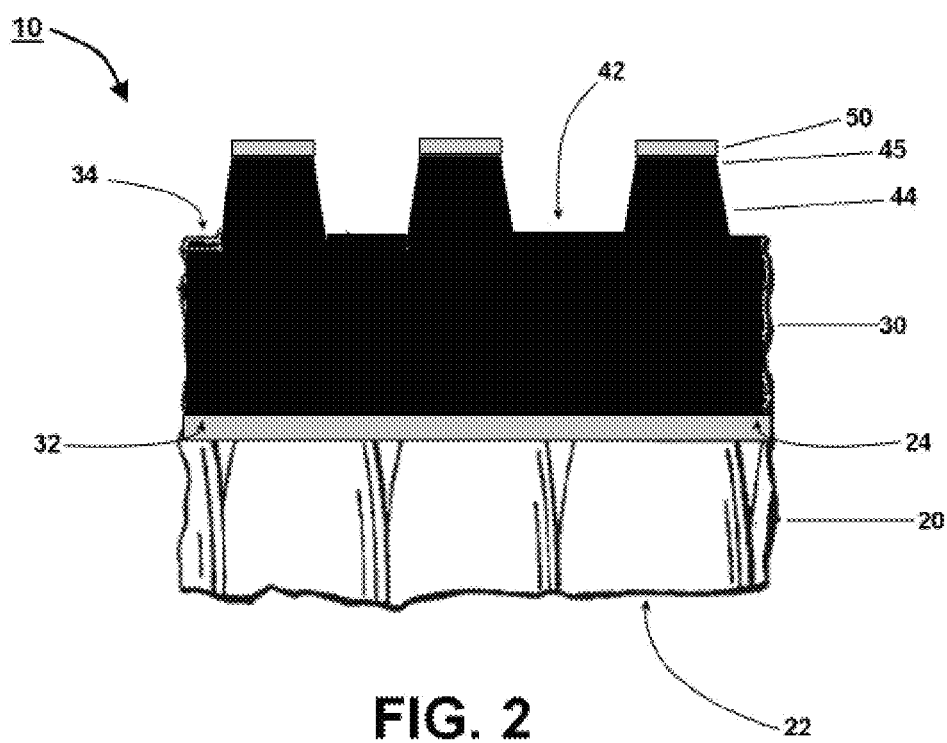
FIG. 2 depicts a cross-sectional view of a portion of the floor covering of FIG. 1.

In a first aspect, and referring to FIG. 1 and FIG. 2, the present disclosure provides generally a floor covering 10 having a plurality of side edges 15 and comprising a greige good 20 and a backing layer 30. In one aspect, the greige good 20 has a face surface 22 and an opposed back surface 24. In another aspect, the backing layer 30 has a top surface 32 and an opposed bottom surface 34 and can be sized and shaped for operably coupling the top surface 32 of the backing layer 30 to the back surface 24 of the greige good 20. In a further aspect, at least a portion of the bottom surface 34 of the backing layer 30 can be thermo-embossed with a pre-determined pattern 40. In still a further aspect, the embossed portion of the bottom surface 34 of the backing layer 30 can define at least one fluid pathway 42 in communication with at least one side edge 15 of the floor covering 10. In one example, it is contemplated that the backing layer 30 can comprise cured embossed polyurethane foam.

In one aspect, the greige good 20 can comprise a plurality of face fibers and a primary backing. The face fibers of the greige good 20 can comprise, for example and without limitation, polypropylene, polyethylene terephthalate (PET), nylon 6, and nylon 6,6, and/or like textile face fibers. The primary backing of the greige good 20 can comprise any substrate material, including, for example and without limitation, woven textile fabrics, non-woven textile fabrics, or a combination of woven and non-woven textile fabrics.

In exemplary embodiments, the primary backing can be a woven or non-woven polymeric scrim material. Exemplary woven polymeric scrims can include woven polypropylene primary backing materials. When the primary backing is a woven textile fabric, such as the exemplary woven polypropylene primary backing, the textile can be formed as flat weave comprised of tape yarns, spun yarns, or a combination of both tape and spun yarns. Still further, suitable woven polypropylene materials can have from 24 to 32 warp threads (threads in the longitudinal direction) per inch and from 10 to 22 weft threads (threads drawn over and under the warp threads to form the fabric weave) per inch. In an exemplary preferred embodiment, the woven polymeric fabric comprises 28 warp threads and 10 weft threads per square inch of fabric. In an alternative preferred embodiment, the woven polymeric fabric comprises 28 warp threads and 12 weft threads per square inch of fabric. An example of a commercially available polypropylene material is a (28×10) woven polypropylene flat weave S7704 as supplied by Sythetic Industries (12454 N Highway 27, Chickamauga, Ga., 30707, U.S.A.).

As noted, in one aspect it is contemplated that the primary backing of the greige good 20 can also comprise a non-woven textile material. Exemplary non-woven textile materials include spun-bonded textiles, hydro-entangled textiles, thermally bonded textiles, wet-laid, melt-blown, air entangled, and needle-punched textiles. In still other embodiments, the primary backing can be a combination of woven and non-woven textile materials. For example, in an embodiment the primary backing can be a fleeced woven primary backing material, whereby a polymeric woven textile is needle-punched with staple fibers to provide a fleeced woven backing material such as a fleeced backing material manufactured by Propex Fabrics, Style 4005 (24×10 FLW) (Dalton, Ga. U.S.A.).

The greige good 20 can comprise virgin, recycled, waste material, or a combination thereof. For example, in a preferred embodiment, the greige good can comprise one or more polymeric materials reclaimed from prior manufactured carpet or other floor covering components. The prior manufactured carpet or other floor covering can include post consumer, post commercial, post residential, post industrial, manufacturing remnants, quality control failures, and the like. Such reclaimed material can be present in the greige good 20 in percentages ranging from 0 up to 100%. For example, the greige good can comprise 10%, 20%, 50%, 40%, 60%, 80%, or 100% post residential or post consumer carpet products. In one exemplary embodiment, the primary backing of the greige good 20 comprises at least about 30% or optionally at least about 50% reclaimed material, such as post consumer carpet material, post industrial carpet material, post commercial carpet material, or a combination thereof.

As one skilled in the art will appreciate, the cured embossed polyurethane foam of the backing layer 30 can be manufactured according to any conventionally known process and formulation for manufacturing polyurethane foam. For example, and without limitation, the cured embossed polyurethane foam can generally be prepared by admixing a first component, such as a polyisocyanate, with a second component, such as an active hydrogen containing material, wherein a gas is introduced therein or produced in situ to form bubbles which in turn form a reduced density expanded cell-like structure in the cured polyurethane. The process of introducing the bubbles is known as mechanically blowing or frothing the formulation. The process of forming bubbles in situ is commonly referred as chemically blowing. The greater the amount of gas introduced into a polyurethane formulation, the lower the density of the resultant foam produced therewith. However, with polyurethane foams generally and with polyurethane foams used in floor covering applications in particular, reducing foam density can also decrease or reduce other properties of the polyurethane foam which can make it a desirable material for use in floor covering applications.

In a preferred embodiment, the cured embossed polyurethane foam of the backing layer 30 is formed from a polyurethane composition that has been both mechanically frothed and chemically blown, such as those disclosed and described in U.S. Pat. No. 6,372,810, the entire disclosure of which is incorporated by reference herein. Polyurethane foams of this nature can be prepared from formulations comprising a polyisocynate component in combination with relatively high levels of a catalyst, a surfactant, and water.

The high level of water can cause a chemical blowing of the foam composition when the water reacts with the polyisocyanate component of the polyurethane formulation. The combination of the mechanical frothing and chemical blowing from the reaction of a polyisocyanate and water results in polyurethane foam having lower densities than those conventionally used in floor covering applications, such as carpet backings and carpet underlays. It should also be appreciated that the polyurethane foams so produced can have sufficiently low densities to be less expensive than conventional polyurethane foams for carpet applications, while maintaining sufficient resiliency and dimensional stability to be desirable for use in various floor covering applications. Such a low density can be achieved for example, by minimizing off-gassing from the polyurethane composition during the curing process, thus providing a cured foam having an expanded cell structure.

In one aspect, the cured embossed polyurethane foam can be thermo-set. As one will appreciate, by thermo-setting the polyurethane foam, the cured embossed polyurethane foam can be irreversibly cured. As one will further appreciate, the irreversibly cured polyurethane foam can increase the strength of the backing material 30 of the floor covering 10.

In another aspect, the synergistic combination of mechanical blowing and chemical blowing can be made possible by the inclusion of high levels of catalyst, water, and surfactant in the formulations used to prepare the polyurethane foam. The foam formulations used to prepare the cured embossed polyurethane foam can have from about 0.5 to about 3 parts water per hundred parts polyol, preferably from about 0.75 to about 2.75 parts water per hundred parts polyol, and more preferably from about 1.5 to about 2.5 parts water per hundred parts polyol. The formulations of the cured embossed polyurethane foam can also include from about 0.01 to about 3.5 parts urethane catalyst per hundred parts polyol, and from 1 to 2 parts surfactant per hundred parts polyol.

The cured embossed polyurethane foam can have any desired density, which will depend on the desired use of the foam. In one aspect, the foam can have a density of from about 2 to about 60 pounds per cubic foot, preferably from about 3 to about 30, more preferably from about 6 to about 18, and even more preferably from about 6 to about 14 pounds per cubic foot. For use in a residential floor covering, an exemplary embossed polyurethane foam can have a density from about 1 to about 10 pounds per cubic foot, including, for example, 2, 4, 6, or 8 pounds per cubic foot. For use in a commercial floor covering, an exemplary embossed polyurethane foam can have a density from about 11 to about 20 pounds per cubic foot, including, for example, 12, 14, 16, or 18 pounds per cubic foot. Alternatively, for use as a laminate flooring underlayment, an exemplary embossed polyurethane foam can have a density from about 15 to about 25 pounds per cubic foot, including, for example, 16, 18, 20, 22, and 24 pounds per cubic foot.

The cured embossed polyurethane foam can also have any desired thickness, which will generally depend on the composition of the greige good, as well as the amount and composition of polyurethane deposited prior to curing. Exemplary embodiments have thickness of from about 80 mils to about 500 mils, including, without limitation, embodiments having thicknesses of about 90 mils, 100 mils, 120 mils, 140 mils, 160 mils, 180 mils, 200 mils, 240 mils, 250 mils, 280 mils, 320 mils, 350 mils, 400 mils, and 450 mils. In a specific exemplary embodiment, the cured embossed polyurethane foam can have a desired thickness of between about $1/16$ and $1/2$ inch, more preferably between about $1/8$ and $3/8$ inch, and most preferably between about $3/16$ and $1/4$ inch.

Exemplary formulations suitable to provide the foam include those formulations disclosed and described in U.S. Pat. No. 5,104,693 (the entire disclosure of which is incorporated by reference herein) but additionally including from about 0.5 to about 3 parts water per hundred parts of polyol, from about 0.01 to about 3.5 parts urethane catalyst per hundred parts of polyol, and from 1 to 2 part surfactant per hundred parts of polyol. In formulations of this type, the polyol component can be at least one isocyanate reactive material having an average equivalent weight of about 1,000 to about 5,000 daltons.

The polyisocyanate can be any polyisocyanate sufficient to provide an isocyanate index of about 90 to about 130, wherein at least 30 percent by weight of the polyisocyanate is a soft segment prepolymer which is the reaction product of a stoichiometric excess of MDI or an MDI derivative and an isocyanate reactive organic polymer having an equivalent weight from about 500 to about 5,000, the prepolymer having an isocyanate group content of about 10 to about 30 percent by weight. The underlay can be prepared by frothing the reactants with air with further blowing as the water reacts with isocyanate to produce carbon dioxide.

The polyurethane foam can comprise a polyol component. The polyol component of the foam formulation can be any polyol or polyol mixture which can be used to prepare a foam which can withstand the physical property and handling requirements of foams used in carpet or textile applications. For example, the polyol component can be a polyol mixture having as one part of the mixture a polyol based on a C3-C8 alkylene oxide, which has an equivalent weight of about 1000 to about 5000 daltons, and an internal poly(ethylene oxide) block or a terminal ethylene oxide cap constituting about 15 to about 30 percent of the weight of the polyol, or mixture of such polyols wherein the polyol or mixture thereof has an average functionality of about 1.8 to about 2.5, preferably from about 1.8 to about 2.4 and more preferably from about a 1.8 to about 2.3. The other portion of the polyol mixture is preferably a minor amount of a low equivalent weight compound having about 2 active hydrogen containing groups per molecule.

The polyurethane foam can be prepared with conventional polyurethane catalysts including, but not limited to, tertiary amine catalysts such as triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethyl aminopropylamine, dimethylbenzyl amine and the like; organotin catalysts such as dimethyltin dilaurate, dibutyltin dilaurate, dioctyltin dilaurate, stannous octoate and the like; and isocyanurate catalysts such aliphatic and aromatic tertiary amine compounds, organotin compounds, alkali metal salts of carboxylic acids, phenols, symmetrical triazine derivatives, and the like.

If an organotin catalyst is used, a suitable cure can be obtained using from about 0.01 to about 0.5 parts per 100 parts of the polyol, by weight. By "suitable cure," it is meant that a relatively rapid cure to a tack-free state is obtained. If a tertiary amine catalyst is used, the catalyst preferably provides a suitable cure using from about 0.01 to about 3 parts of tertiary amine catalyst per 100 parts of the polyol, by weight. Both an amine type catalyst and an organotin catalyst can be employed simultaneously in any combination or ratio. If a combination of amine catalyst and organotin catalyst is used, the catalysts can be used in an amount of from about 0.02 to about 3.5 parts per 100 parts of polyol, by weight.

The polyurethane foam can be prepared using both mechanical and chemical blowing agents. The mechanical blowing agent is introduced into a foam forming mixture by a mechanical device. The blowing agent is preferably air, however, other gasses, such as carbon dioxide, nitrogen, and the like can be used. The blowing agent is preferably introduced into the polymer by frothing. A frother is a mechanical device which injects the blowing agent into an admixture as it agitates the admixture. Chemical blowing agents as used herein are volatile materials, or materials that produce gaseous materials as the result of a chemical reaction. Chemical blowing agents useful for these purposes include, for example, liquids such as water, volatile halogenated alkanes such as the various chlorfluoromethanes and chlorfluoroethanes; azo-blowing agents such as azobis(formamide). Water is the preferred chemical blowing agent.

The polyurethane foam can be prepared from formulations that can also include fillers. The fillers can be any suitable filler, including, for example, aluminum oxide trihydrate (alumina), calcium carbonate, barium sulfate or mixtures thereof. As one skilled in the art will appreciate, it is contemplated that other fillers can also be used, such as, for example and without limitation, virgin materials, waste materials, reclaimed materials; recycled materials, pre and post consumer and industrial materials, pre and post consumer and industrial carpet materials, carpet materials in any form, and the like. On non-limiting example of recycled fillers include coal fly ash, which has been found to be useful in amounts from about 100 to about 400 parts by weight.

In general, the formulations used to prepare the polyurethane foam include fillers at any desired level. For example, the amount of filler can be determined relative to parts polyol. To that end, an exemplary polyurethane foam can have from about 80 parts per hundred parts of polyol to about 250 parts per hundred parts of polyol, including, without limitation, 90, 100, 120, 130, 150, 160, 190, 200, 220, and 140 parts per hundred parts of polyol. Alternatively, the amount of filler can be determined relative to any other desired component of the polyurethane composition, or even relative to the total weight of the polyurethane composition. For example, in an exemplary and non-limiting embodiment, the polyurethane foam can comprise from about 100 to about 200 parts by weight filler, including, for example, 110, 120, 130, 140, 150, 160, 170, 180, and 190 parts by weight filler, relative to the total weight of the polyurethane.

In one aspect, the polyisocyanate component of the formulations used to prepare the polyurethane foam can be conveniently selected from organic polyisocyanates, modified polyisocyanates, isocyanate-based prepolymers, and mixtures thereof. These can include aliphatic and cycloaliphatic isocyanates, aromatic and multifunctional aromatic isocyanates. Exemplary polyisocyanates include, but are not limited to, 2,4- and 2,6-toluenediisocyanate and the corresponding isomeric mixtures; 4,4'-, 2,4'- and 2,2'-diphenyl-methanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates. Aliphatic and cycloaliphatic isocyanate compounds are also useful for preparing the polyurethanes. Such examples, include 1,6-hexamethylene-diisocyanate; 1-isocyanato-3,5,5-trimethyl-1-3-isocyanatomethyl-cyclohexane; 2,4- and 2,6-hexahydrotoluenediisocyanate, as well as the corresponding isomeric mixtures; 4,4'-, 2,2'- and 2,4'-dicyclohexylmethanediisocyanate, as well as the corresponding isomeric mixtures.

Modified multifunctional isocyanates can also be used, i.e., products which are obtained through chemical reactions of the above diisocyanates and/or polyisocyanates. Examples include polyisocyanates containing esters, ureas, biurets, allophanates and including carbodiimides and/or uretonimines; isocyanurate and/or urethanes containing diisocyanates or polyisocyanates. Liquid polyisocyanates containing carbodiimide groups, uretonimine groups and/or isocyanurate rings, having isocyanate groups (NCO) contents (42/polyisocyanate mwt) of from about 10 to about 40 weight percent, or from about 20 to about 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI and mixtures of toluenediisocyanates and PMDI and/or diphenylmethane diisocyanates.

Prepolymers can also be useful with the formulations used to prepare the polyurethane foam. In one aspect, suitable prepolymers are prepolymers having NCO contents of from about 5 to about 40 weight percent, more preferably from about 15 to about 30 weight percent. These prepolymers are prepared by reaction of the di- and/or polyisocyanates with materials such as lower molecular weight diols and triols, but also they can be prepared with multivalent active hydrogen compounds such as di- and tri-amines and di- and tri-thiols. Specific examples include aromatic polyisocyanates containing urethane groups, having NCO contents of from about 5 to about 40 weight percent, or about 20 to about 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates can also be used with the formulations. Additionally, prepolymers containing NCO groups, having an NCO content of from about 20 to about 35 weight percent, based on the weight of the prepolymer, prepared by the reaction of polyoxyalkylene polyols, having a functionality of from 2 to 4 and a molecular weight of from about 800 to about 15,000 with 4,4'-diphenylmethane diisocyanate or with a mixture of 4,4'- and 2,4'-diphenylmethane diisocyanates and mixtures of polyisocyanates and prepolymers; and 2,4- and 2,6-toluene-diisocyanate or the corresponding isomeric mixtures. PMDI in any of its forms can also be used. PMDI can have an equivalent weight of from about 125 to about 300, or from about 130 to about 175, with an average functionality of greater than about 2. An average functionality can also be from about 2.5 to about 3.5. The viscosity of the polyisocyanate component can be from about 25 to about 5,000 centipoise (cps) (0.025 to about 5 PaYs), but values from about 100 to about 1,000 cps at 25.degree. C. (0.1 to 1 PaYs) are also useful for ease of processing. Similar viscosities are useful where alternative polyisocyanate components are selected. In one aspect, the polyisocyanate component of the formulations of the present invention is selected from MDI, PMDI, an MDI prepolymer, a PMDI prepolymer, a modified MDI, and a combination thereof.

Polyfunctional active hydrogen containing materials useful with the present formulations can include materials other than those described above. Active hydrogen containing compounds commonly used in polyurethane production are those compounds having at least two hydroxyl groups. Those compounds are referred to herein as polyols. Representatives of suitable polyols are generally known and are described in such publications as High Polymers, Vol. XVI, "Polyurethanes, Chemistry and Technology" by Saunders and Frisch, Interscience Publishers, New York, Vol. I, pp. 32-42, 44-54 (1962) and Vol. II, pp. 5-6, 198-199 (1964); Organic Polymer Chemistry by K. J. Saunders, Chapman and Hall, London, pp. 323-325 (1973); and Developments in Polyurethanes, Vol. I, J. M. Burst, ed., Applied Science Publishers, pp. 1-76 (1978). However, any active hydrogen containing compound can be used with the present invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Examples of alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also useful are poly(oxypropylene)glycols, triols, tetrols and hexyls and any of these that are capped with ethylene oxide. Poly(oxypropyleneoxyethylene)polyols is an exemplary, non-limiting polyols. The oxyethylene content conveniently comprise less than about 80 weight percent of the total polyol weight, or less than about 40 weight percent. The ethylene oxide, if used, can be incorporated in any way along the polymer chain, for example, as internal blocks, terminal blocks, or randomly distributed blocks, or any combination thereof.

Polyamines, amine-terminated polyols, polymercaptans and other isocyanate-reactive compounds are also suitable for use with the disclosed formulations. Polyisocyanate polyaddition active hydrogen containing compounds (PIPA) are particularly preferred for use with the present invention. PIPA compounds are typically the reaction products of TDI and triethanolamine. A method for preparing PIPA compounds can be found in, for example, U.S. Pat. No. 4,374,209, issued to Rowlands.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyro-nitrile; copolymer polyol stabilizers; and chain transfer agents such as isopropanol. Polyols comprising natural oils such as soy, sunflower, and safflower oil can be desirable in combination with standard petroleum based polyols. It should be appreciated that such oils can help to offset the overall carbon footprint of the product.

In an exemplary embodiment, the polyurethane foam can comprise about 160 parts of a blend of isocyanate and a selected polyol and approximately 100 parts of a filler containing calcium carbonate. As one will appreciate, the calcium carbonate can enhance curing of the polyurethane foam. It is contemplated that the density of the polyurethane foam of this embodiment can be between about 400 to 500 grams per quart measured.

In one aspect, and referring to FIG. 1 and FIG. 2, the bottom surface 34 of the backing layer 30 of the floor covering 10 can define at least one male projection 44. In this aspect, at least one fluid pathway 42 of the bottom surface 34 can be defined therebetween adjacent respective male projections 44 of the at least one male projection. In one aspect, each male projection 44 of the at least one male projection can have a distal end 45. In another aspect, the at least one male projection 44 can comprise a plurality of raised bands. In one exemplary embodiment, as shown in FIG. 1, the at least one male projection 44 can comprise a plurality of raised serpentine bands. In another embodiment, the at least one male projection 44 can comprise a plurality of raised straight-ribbed bands. In an additional embodiment, the at least one male projection 44 can comprise a plurality of raised bands having a dog bone crosshatch configuration. As one of ordinary skill in the art will appreciate, the at least one male projection 44 can comprise a plurality of raised bands having any raised relief shape or configuration. In another aspect, the at least one male projection 44 can comprise a plurality of substantially parallel raised bands. In a further aspect, the at least one male projection 44 can be outwardly sloped from the distal ends 45 of the at least one male projection toward the backing layer 30.

As one will appreciate, the at least one male projection 44 can be configured to promote the flow of moisture to the at least one fluid pathway 42. As one will further appreciate, the at least one fluid pathway 42 defined therebetween the male projections 44 of the backing layer 30 can be configured to disperse moisture and air through the at least one fluid pathway to at least one side edge 15 of the floor covering 10.

In an additional aspect, the distal ends 45 of the at least one male projection 44 correspond to a portion of the cross-sectional area of the bottom surface 34 of the backing layer 30. For example, and without limitation, the cross-sectional area of the distal ends 45 of the at least one male projection 44 can be at least 10%, 20%, 30%, 40%, 50%, 60%, 70%, 80%, or 90% of the cross-sectional area of the bottom surface 34 of the backing layer 30. In a further aspect, the predetermined pattern 40 that is embossed therein the polyurethane composition can have a selected depth. In exemplary embodiments, the selected depth of the predetermined embossed pattern 40 can be between about ⅟₃₂ inch and ½ inch, more preferably between about ⅟₁₆ inch and ¼ inch, and most preferably between about ⅛ inch and ³⁄₁₆ inch.

In another aspect, and referring to FIG. 2, the backing layer 30 of the floor covering 10 can further comprise a layer of cured skid-resistant material 50 connected to at least a portion of the bottom surface 34 of the backing layer. For example, the skid-resistant material 50 can be applied on the distal most portions of the at least one male projection 44. In one aspect, the skid-resistant material 50 can be configured to be slip-resistant to a selected material, for example and without limitation, fiberglass. As one will appreciate, the skid-resistant material 50 can provide additional stability to the floor covering 10 when used in wet or moist environments, including, for example and without limitation, marine environments.

In another aspect, and as one will appreciate, due to the specific gravity of the greige good 20 and the presence of closed cells in portions of the backing layer 30, the floor covering 10 can be configured to float in water. It is contemplated that the floor covering 10 can function as a floating device as needed.

In another aspect, the skid-resistant material 50 can comprise a polymer. In an additional aspect, the skid-resistant material 50 can comprise an acrylic polymer. In a further aspect and as exemplarily shown in FIG. 2, the skid-resistant material 50 can comprise an acrylic polymer blended with water. In an exemplary embodiment, the skid-resistant material 50 can comprise an acrylic polymer blended with water such that between about 50% and 60% of the skid-resistant material comprises solid material. In a specific exemplary embodiment, the skid-resistant material 50 can comprise an acrylic polymer blended with water such that about 52% of the skid-resistant material comprises solid material. In another aspect, the skid-resistant material 50 can comprise latex. In a further aspect, the weight of the skid-resistant material 50 can be about two ounces per square yard of floor covering.

In an additional aspect, the backing layer 30 can have a selected depth of between about ⅟₁₆ and ½ inch, more preferably between about ⅛ and ⅜ inch, and most preferably between about ³⁄₁₆ and ¼ inch. For example, the selected depth of the backing layer 30 can be, without limitation, a 0.1, 0.2, 0.3, and 0.4 inch depth, although virtually any depth can be used. In a further aspect, the backing layer 30 can have a weight of from about 10 to about 50 ounces per square yard of material, more preferably from about 20 to about 40 ounces per square yard. In one exemplary embodiment, the weight of the backing layer 30 can be about 24 ounces per square yard. In still a further aspect, the backing layer 30 can have a density of from about 8 to about 22 pounds per cubic foot, more preferably from about 10 to about 15 pounds per cubic foot, and most preferably from about 12 to about 14 pounds per cubic foot.

The present invention also provides a method for producing the floor covering 10 disclosed and described herein. In a first aspect, and referring to FIGS. 3A AND 3B, the method for producing the floor covering comprises providing the greige good 20 as described herein. In another aspect, the method comprises applying a foamable polyurethane composition 36 as described herein to the back surface 24 of the greige good 20. In another aspect, the method comprises metering the applied polyurethane composition 36 to form a substantially uniform layer of the foamable polyurethane composition having a predetermined thickness. In an additional aspect, the method comprises partially curing the foamable polyurethane composition 36. In a further aspect, the method comprises embossing the partially cured polyurethane composition with the predetermined pattern 40. In still a further aspect, the method comprises curing the embossed polyurethane composition.

In another aspect, the method can further comprise applying the layer of skid-resistant material 50 to at least a portion of a top surface of the cured embossed polyurethane composition. In an additional aspect, the application of the layer of skid-resistant material 50 can comprise applying the skid-resistant material to at least a portion of the top surface of the cured embossed polyurethane composition using a roll applicator 60. For example, and without limitation, the skid-resistant material 50 can be applied to at least a portion of the top surface of the cured embossed polyurethane composition using a lick roller. In a further aspect, the method can further comprise curing the layer of skid-resistant material 50.

In an additional aspect, following the production of the floor covering 10, the floor covering can be transported through additional post-manufacture processing steps. For example, and without limitation, the floor covering can be transported through a roll-up process 70. However, it is contemplated that the floor covering 10 can be transported through any other post-manufacturing process known in the art.

The polyurethane foam, as discussed above, can be an uncured mechanically frothed and chemically blown polyurethane composition. In some embodiments, it can be preferable to premix all of the components of the foam formulation except polyisocyanate (and the blowing agent when a gas is used). The polyisocyanate and other components, as discussed above, can first be admixed and then the blowing agent gas can be blended in using, for example, a mixer, such as an OAKES FROTHER. Variable speed pumps can be used to transport the separate components to the mixer. The composition can then be applied to the back surface 24 of the greige good 20 prior to curing. In an exemplary embodiment, the polyurethane composition can be applied to the back surface 24 of the greige good 20 within about 10 to 30 seconds of mixing of the separate components.

Figure 3A:
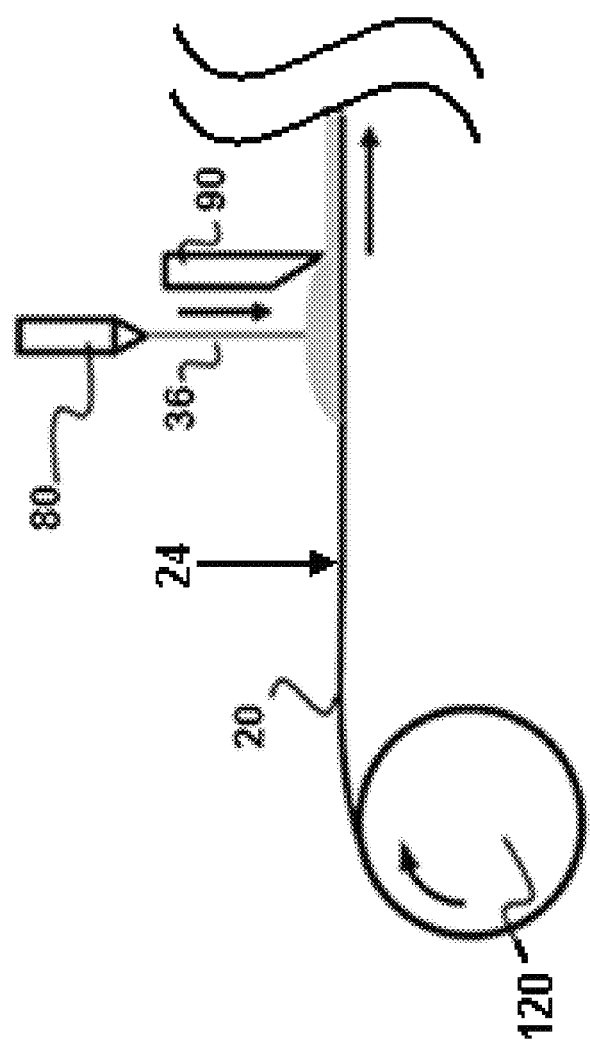
FIGS. 3A and 3B are schematic drawings of an exemplary belted oven and processing apparatus for manufacturing the floor covering of FIG. 1.
Figure 3B:
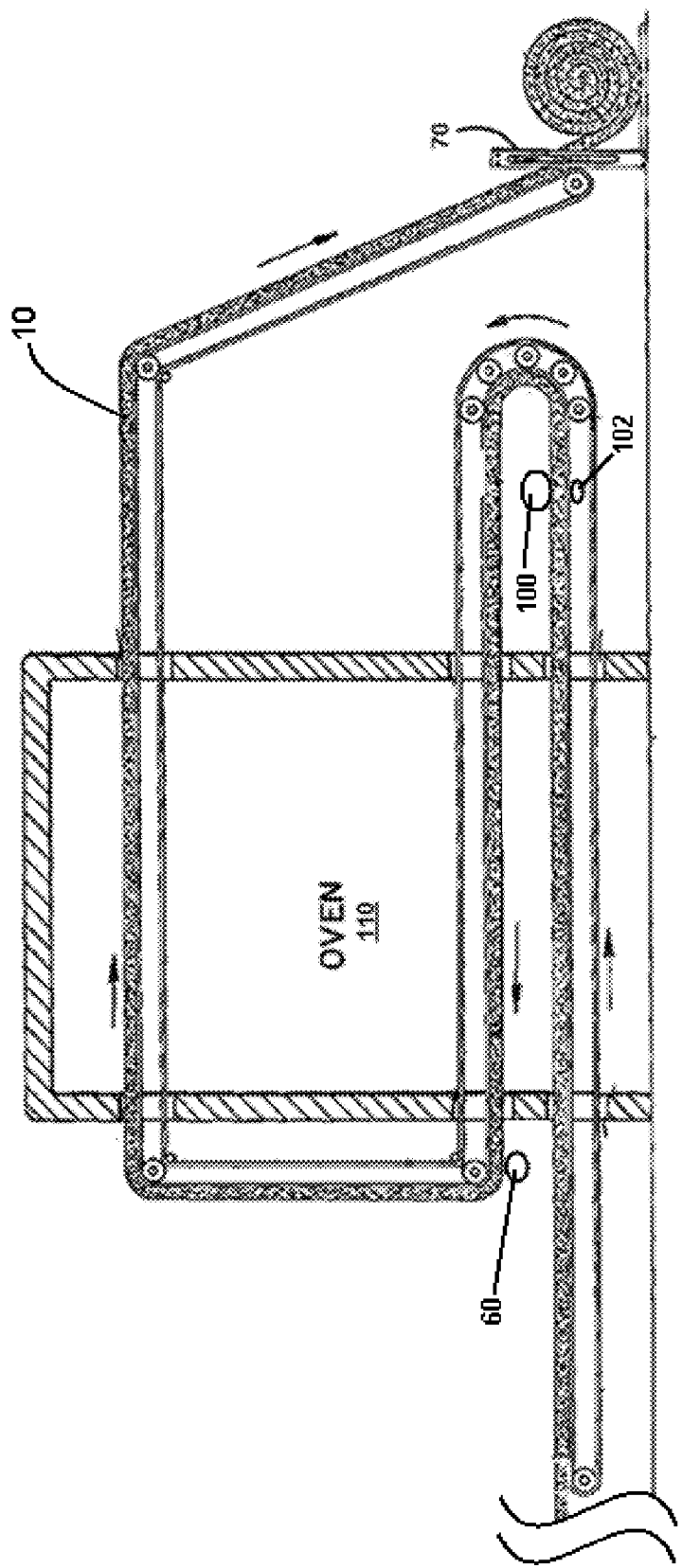

In one aspect, and referring to FIG. 1, FIG. 3A, and FIG. 3B, the greige good 20 can be provided from a roll 120. In another aspect, the foamable polyurethane composition 36 can be applied to the back surface 24 of the greige good 20 using a foam applicator 80. In an additional aspect, the applied polyurethane composition can be metered to a desired thickness using a blade 90, such as, without limitation, an air blade, a knife blade, an extruder blade, a doctor blade, and the like. In an exemplary aspect, the applied polyurethane composition can be metered within about 1 to 3 seconds of application of the foamable polyurethane composition 36 to the back surface 24 of the greige good 20. In a further aspect, following the partial curing of the foamable polyurethane composition 36, the partially cured polyurethane composition can be embossed with a predetermined pattern 40 by passing the greige good/partially cured backing material therebetween an embossing roller 100 and a press roller 102. The embossing roller 100 and the press roller 102 cooperate conventionally to ensure that the surface of the embossing roller is pressed thereinto the surface of the partially cured polyurethane composition so as to form the desired embossed pattern. In still a further aspect, the embossing roller 100 can be coated with water prior to embossing the partially cured polyurethane composition.

In another aspect, the steps of partially curing the foamable polyurethane composition 36 and curing the embossed polyurethane composition are performed in an oven 110. In an additional aspect, following the application of the skid-resistant material 50 to the cured embossed polyurethane composition, the step of curing the layer of skid-resistant material can be performed in the oven 110.

In an exemplary embodiment, the oven 110 can be a belted oven. Alternatively, with reference to FIG. 1 and FIG. 4, the greige good 20 can be provided from the roll 120 using a tenter apparatus (not shown). As will be apparent, the present composite structures are uniquely compatible with tenter-based machinery. It should be appreciated that the use of a tenting apparatus can provide advantages over using other manufacturing equipment, including belt-driven machinery. For example, a tenting apparatus does not require the use of a belt, which can be costly to maintain and replace, since the offline machinery time alone can present substantial economic loss.

Figure 4:
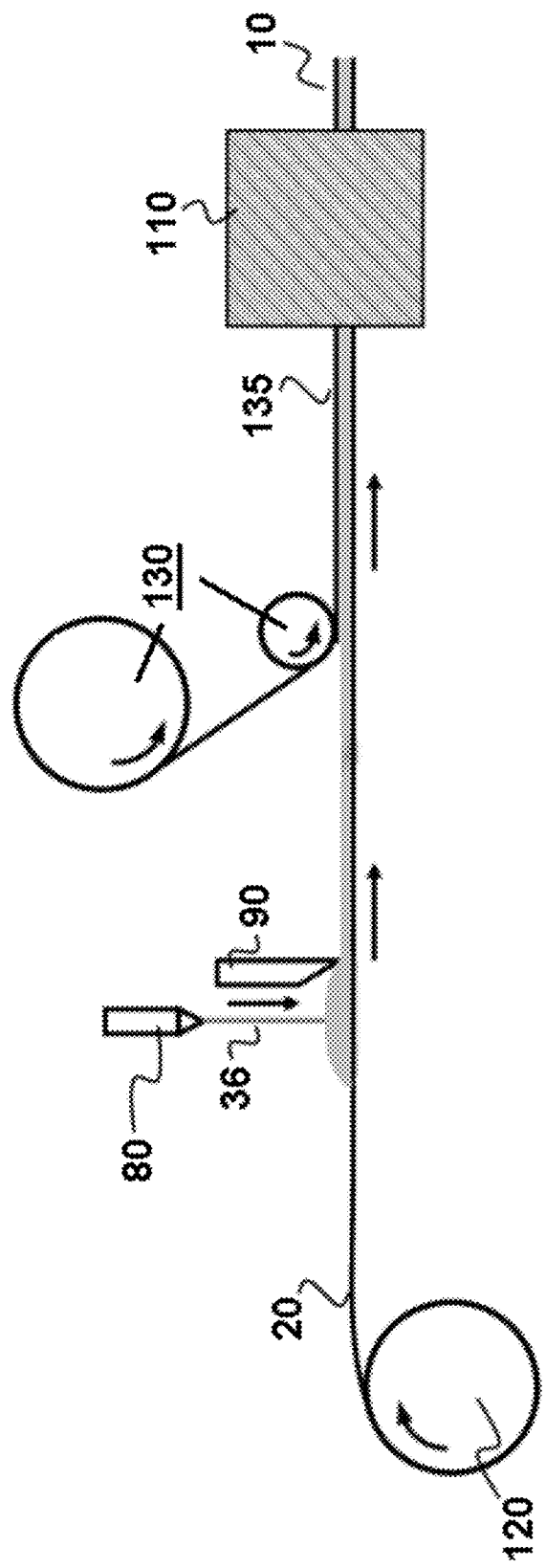
FIG. 4 is a schematic drawing of an exemplary tenter apparatus and oven for manufacturing the floor covering of FIG. 1.

In addition, the versatility of composite structures that can be produced by a belt-driven process is limited. With a double belt-driven process, the belts themselves provide a gas impermeable barrier to the foam layer. The belt coatings provide a substantially constant gas impermeability, such that resulting foam composites have similar densities. To replace such coatings in order to provide composites with varying densities can be costly. In accordance with the present methods, however, the backing layer 30 and a protection layer 135, as opposed to a belt, can provide gas impermeable layers when used with a tenting apparatus. It is contemplated that the protective layer 135 can comprise, for example and without limitation, woven, non-woven, spun bound fabrics, films, textiles and the like. As illustrated in FIG. 4, it is contemplated that the protective layer can be provided by a film layering apparatus 130, which can comprise, for example and without limitation, one or more rollers. As discussed herein, the backing layer 30 and the protective layer 135 can comprise a variety of different materials, all with varying levels of gas permeability. Thus, composite structures with varying density levels can be provided by simply changing the properties of the backing layer and the protective layer, without substantially altering manufacturing conditions.

Furthermore, the present methods provide improved heat transfer from the curing oven to the foam layer by using a tenter apparatus in combination with a three-layer structure. Heat transfer is limited in a belt-driven process by the heat transfer capacity of the belts themselves, whereas according to the present methods, differing degrees of heat transfer can be accomplished by simply utilizing different materials as the backing layer and/or the film layer, as discussed above. The use of a tenter apparatus to produce floor coverings as described herein is further described in U.S. patent application Ser. No. 12/619,059, the entire disclosure of which is incorporated by reference herein.

Regardless of whether a tenter apparatus or a belted oven is used in the methods described herein, it is contemplated that the curing steps can be carried out in any suitable oven, including, without limitation, a single pass oven, a multiple pass (including a double or triple pass oven), an infrared oven, an open-flamed oven, and an open-flamed forced draft convection impingement oven, or simply with a heating plate, the selection of which can depend, in one aspect, on available space at a manufacturing facility. It is contemplated that the method of production described herein can be completed by passing the floor covering 10 through one or more ovens for one, two, three or more passes as necessary and desired.

In an exemplary embodiment, as shown in FIGS. 3A AND 3B, the curing steps can be carried out in a triple pass oven, for example, and without limitation, a 110 foot triple pass oven. In a first aspect, and referring to FIG. 2 and, FIG. 3A, and FIG. 3B, the step of partially curing the foamable polyurethane composition 36 can be performed in a first pass through the triple pass oven 110. During this first pass through the oven 110, the floor covering 10 can be positioned with the face surface 22 facing downwardly. As one will appreciate, positioning the floor covering 10 with the face surface 22 facing downwardly during the first pass through the oven 110 permits effective curing of the foamable polyurethane composition 36. It is contemplated that the floor covering 10 can begin the first pass through the oven 110 at approximately 30 to 45 seconds after application of the foamable polyurethane composition 36 to the greige good 20.

In another aspect, the step of curing the embossed polyurethane composition is performed in a second pass through the triple pass oven 110. During this second pass through the oven 110, the floor covering 10 can be positioned with the face surface 22 facing upwardly. As one will appreciate, positioning the floor covering 10 with the face surface 22 facing upwardly during the second pass through the oven 110 helps preserve the structure of the partially cured polyurethane composition after it is embossed with the predetermined pattern 40.

In a further aspect, and referring to FIG. 2, FIG. 3A, and FIG. 3B, after the second pass through the oven 110, the layer of skid-resistant material 50 can be applied to at least a portion of the top surface of the cured embossed polyurethane composition. In an exemplary method, the layer of skid-resistant material 50 can be applied to at least a portion of the distal ends 45 of the at least one male projection 44. In one aspect, and as shown in FIGS. 3A AND 3B, the skid-resistant material 50 can be applied by a roll applicator 60 positioned underneath the floor covering 10 while the floor covering is positioned with the face surface 22 facing upwardly. As one will appreciate, by applying the skid-resistant material 50 to the top surface of the cured embossed polyurethane composition using a roll applicator 60, only the distal ends 45 of the at least one male projection 44 will contact the roll applicator. Therefore, as one will further appreciate, the skid-resistant material 50 can be applied to only the areas of the floor covering 10 that will be in direct contact with a floor.

In still a further aspect, the step of curing the layer of skid-resistant material 50 can be performed in a third pass through the triple pass oven 110. However, as one will appreciate, because of the elevated temperature of the floor covering 10 at the time of application of the layer of skid-resistant material 50, a portion of the layer of skid-resistant material can be cured before the third pass through the oven 110. Thus, during the third pass through the oven 110, any uncured skid-resistant material 50 will be completely cured. During this third pass through the oven 110, the floor covering 10 can be positioned with the face surface 22 facing downwardly. As one will appreciate, positioning the floor covering 10 with the face surface 22 facing downwardly during the third pass through the oven 110 permits effective curing of the skid-resistant material 50.

In an additional aspect, the step of partially curing the foamable polyurethane composition 36 can comprise substantially curing at least about 60% of the foamable polyurethane composition. In another aspect, the step of partially curing the foamable polyurethane composition 36 can comprise substantially curing at least about 70% of the foamable polyurethane composition. In a further aspect, the first pass through the oven 110, and thus, the partial curing of the foamable polyurethane composition 36, can be completed within about three to three and a half minutes of applying the foamable polyurethane composition to the back surface 24 of the greige good 20.

In exemplary embodiments, the foamable polyurethane composition 36 can have a selected curing profile, wherein the polyurethane composition is expected to be cured a given amount after a particular amount of time has elapsed since the polyurethane composition is exposed to heat from the oven 110. In one specific exemplary embodiment, the foamable polyurethane composition 36 can have a selected curing profile whereby the polyurethane composition is cured about 10% at one minute after exposure to heat, about 20% at two minutes after exposure to heat, about 70% at three minutes after exposure to heat, about 75% at three and a quarter minutes after exposure to heat, about 90% at four minutes after exposure to heat, and about 100% at five minutes after exposure to heat.

In a further aspect, during the step of curing the layer of skid-resistant material 50, the skid-resistant material can be about 90% cured within about 10 seconds of applying the skid-resistant material to the floor covering 10. As one will appreciate, the layer of skid-resistant material 50 can be applied after the floor covering 10 has been exposed to heat for about 6 to 7 minutes, thereby shortening the time required to substantially cure the skid-resistant material. In an additional aspect, the skid-resistant material 50 can be about 100% cured by the end of the third pass through the oven 110. It is contemplated that the third pass through the oven 110 can last for about three to three and a half minutes.

In another aspect, the oven 110 can generate heat at a desired oven temperature to cure the floor covering 10. In one aspect, the desired oven temperature can be between about 150° F. and 250° F., more preferably between about 175° F. and 240° F., and most preferably between about 200° F. and 230° F. In an exemplary embodiment, the face surface 22 of the floor covering 10 can be heated at an oven temperature of about 220° F., while the back surface 24 of the floor covering can be heated at an oven temperature of about 200° F. In an additional embodiment, the skid-resistant material 50 can be heated at an oven temperature of about 200° F. As one will appreciate, in a triple-pass oven, each pass through the oven 110 can subject the floor covering 10 to different temperatures. For example and without limitation, the desired oven temperature can be 225° F. during the first pass through the oven, 200° F. during the second pass through the oven, and 200° F. during the third pass through the oven. As one will further appreciate, as the depth of the polyurethane composition increases, the oven temperature can be selectively increased to cure the polyurethane composition. For example, and without limitation, a polyurethane composition having a depth of approximately 3/16 inch can be heated at an oven temperature of about 200° F., while a polyurethane composition having a depth of approximately 5/16 inch can be heated at an oven temperature of about 225° F.

As described herein, and referring to FIG. 1, FIG. 3A, and FIG. 3B, the foamable polyurethane composition 36 can be thermo-embossed with the pre-determined pattern 40 to define at least one fluid pathway 42 in communication with at least one side edge 15 of the floor covering 10. As one will appreciate, by partially curing the foamable polyurethane composition 36 prior to embossing, the foamable polyurethane composition is soft enough to accept the embossing roller 100 and also stable enough for the structure of the at least one fluid pathway 42 to be maintained during the additional curing steps of the method.

The speed of the process can vary depending on the desired properties of the composite and/or manufacturing constraints. In preferred embodiments, the speed of the oven belt and/or the speed of the tenter apparatus is held at from about 5 feet per minute to about 60 feet per minute, or from about 10 feet per minute to about 50 feet per minute, or from about 15 feet per minute to about 40 feet per minute, or more preferably 25 feet per minute to 45 feet per minute. In one specific embodiment, the speed of the oven belt can be held at about 35 feet per minute.

The present invention further provides a method for producing a floor backing consistent with the method for producing the floor covering disclosed and described herein. In a first aspect, the method for producing the floor backing comprises applying a foamable polyurethane composition as described herein to a back surface of a floor covering. In another aspect, the method comprises metering the applied polyurethane composition to form a substantially uniform layer of the foamable polyurethane composition having a predetermined thickness. In an additional aspect, the method comprises partially curing the foamable polyurethane composition. In a further aspect, the method comprises embossing the partially cured polyurethane composition with the predetermined pattern. In still a further aspect, the method comprises curing the embossed polyurethane composition.

In another aspect, the method can further comprise applying the layer of skid-resistant material to at least a portion of the top surface of the cured embossed polyurethane composition. In an additional aspect, the method can further comprise curing the layer of skid-resistant material.

The method for producing a floor backing as herein described is suitable for use with virtually any floor covering application, including without limitation, wood flooring, laminate flooring, sheet resilient flooring, residential carpeting, industrial carpeting, commercial carpeting, broadloom carpeting, carpet tiles, tufted carpets, needle-punched carpets, hand woven carpets, broadloom carpets, automotive carpets, carpet tiles, and even area rugs. Other suitable textiles include fabrics for automotive trim, and automotive trunk liners, synthetic playing surfaces, woven polymeric scrim, non-woven polymeric scrim, wall coverings, sheet polymers, furniture covers, and the like.

Experimental testing of the floor coverings and floor backings described herein has demonstrated the ability of the floor coverings and floor backings to disperse fluids away from the floor coverings and floor backings. In one experiment, a fiberglass- and gel-coated boat decking material was cut into a 2 foot by 2 foot square and placed on a level surface. A 6 inch diameter of tap water, which amounted to approximately 1 ounce of water, was poured onto the center portion of the upper surface of the decking material. A 18 inch by 18 inch sample of a floor covering as described herein was gently lowered onto the decking material with the water puddle in the center of the floor covering. The floor covering was not weighted and was positioned as a carpet mat would lie on a boat deck. The floor covering sample was removed at 24 hrs and 48 hours for observation.

The experimental results demonstrated that the water was 80% dissipated at 24 hours and 100% dissipated at 48 hours. As one will appreciate, these results indicate that the fluid pathways formed through the thermo-embossing of the backing layer of the floor covering as described herein can promote evaporation and dispersal of fluids while simultaneously promoting flow of air into the fluid pathways. Importantly, both the cured polyurethane and skid-resistant material of the backing layer are waterproof and will not allow evaporation through the carpet. Therefore, as one will appreciate, fluids within the fluid pathways of the floor covering are guided to at least one side edge of the floor covering.

The preceding description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. The corresponding structures, materials, acts, and equivalents of all means or step plus function elements in the claims below are intended to include any structure, material, or acts for performing the functions in combination with other claimed elements as specifically claimed.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Accordingly, those who work in the art will recognize that many modifications and adaptations to the present invention are possible and can even be desirable in certain circumstances and are a part of the present invention. Other embodiments of the invention will be apparent to those skilled in the art from consideration of the specification and practice of the invention disclosed herein. Thus, the preceding description is provided as illustrative of the principles of the present invention and not in limitation thereof. It is intended that the specification and examples be considered as exemplary only, with a true scope and spirit of the invention being indicated by the following claims.

What is claimed is:

1. A method for producing a floor covering, comprising:
providing a greige good having a face surface and a back surface;
applying a foamable polyurethane composition to the back surface of the greige good;
metering the applied polyurethane composition to form a substantially uniform layer of the foamable polyurethane composition having a predetermined thickness;
partially curing the foamable polyurethane composition, wherein the step of partially curing the foamable polyurethane composition comprises substantially curing at least about 60% of the foamable polyurethane composition;
embossing the partially cured polyurethane composition to define a predetermined pattern in the partially cured polyurethane composition, the predetermined pattern comprising a plurality of discrete spaced male projections extending away from a plane positioned within the partially cured polyurethane composition and oriented substantially parallel to the back surface of the greige good, wherein each male projection has a top surface, wherein adjacent male projections of the plurality of discrete spaced male projections cooperate to define a plurality of fluid pathways, and wherein each fluid pathway is in communication with at least one side edge of the floor covering and configured to disperse fluid to the at least one side edge of the floor covering;
curing the embossed polyurethane composition;
applying a layer of skid-resistant material to only the top surface of the plurality of discrete spaced male projections of the cured embossed polyurethane composition; and
curing the layer of skid-resistant material,
wherein the steps of partially curing the foamable polyurethane composition, curing the embossed polyurethane composition, and curing the layer of skid-resistant material are each separately performed in a belted oven.

2. The method of claim 1, wherein the plurality of discrete spaced male projections of the predetermined pattern comprises a plurality of raised serpentine bands.

3. The method of claim 1, wherein the oven is a triple-pass oven.

4. The method of claim 3, wherein the step of partially curing the foamable polyurethane composition is performed in a first pass through the oven, wherein the step of curing the embossed polyurethane composition is performed in a second pass through the oven, and wherein the step of curing the layer of skid-resistant material is performed in a third pass through the oven.

5. The method of claim 4, wherein the floor covering is positioned with the face surface facing downwardly during the first pass through the oven.

6. The method of claim 5, wherein the floor covering is heated to about 200° F. during the first pass through the oven.

7. The method of claim 4, wherein the floor covering is positioned with the face surface facing upwardly during the second pass through the oven.

8. The method of claim 7, wherein the floor covering is heated to about 220° F. during the second pass through the oven.

9. The method of claim 4, wherein the floor covering is positioned with the face surface facing downwardly during the third pass through the oven.

10. The method of claim 9, wherein the floor covering is heated to about 200° F. during the third pass through the oven.

11. The method of claim 1, wherein the step of partially curing the foamable polyurethane composition comprises substantially curing at least about 70% of the foamable polyurethane composition.

12. The method of claim 4, wherein the first pass through the oven is completed within about three minutes of applying the foamable polyurethane composition.

13. The method of claim 1, further comprising the step of transporting the floor covering through a roll-up process.

14. The method of claim 1, wherein the greige good comprises polypropylene.

15. The method of claim 1, wherein the skid-resistant material comprises an acrylic polymer.

16. The method of claim 15, wherein the skid-resistant material comprises an acrylic polymer blended with water at a ratio of greater than 50% solids to water.

17. The method of claim 1, wherein the cured polyurethane composition is thermo-set.

18. The method of claim 1, wherein at least a portion of the greige good comprises reclaimed materials.

19. A method for producing a floor backing, comprising:
applying a foamable polyurethane composition to a back surface of a floor covering;
metering the applied polyurethane composition to form a substantially uniform layer of the foamable polyurethane composition having a predetermined thickness;
partially curing the foamable polyurethane composition, wherein the step of partially curing the foamable polyurethane composition comprises substantially curing at least about 60% of the foamable polyurethane composition;

embossing the partially cured polyurethane composition to define a predetermined pattern in the partially cured polyurethane composition, the predetermined pattern comprising a plurality of discrete spaced male projections extending away from a plane positioned within the partially cured polyurethane composition and oriented substantially parallel to the back surface of the floor covering, wherein each male projection has a top surface, wherein adjacent male projections of the plurality of discrete spaced male projections cooperate to define a plurality of fluid pathways, and wherein each fluid pathway is in communication with at least one side edge of the floor covering and configured to disperse fluid to the at least one side edge of the floor covering;

curing the embossed polyurethane composition;

applying a layer of skid-resistant material to only a top surface of the plurality of discrete spaced male projections of the cured embossed polyurethane composition; and curing the layer of skid-resistant material, wherein the step of partially curing the foamable polyurethane composition is performed in a first pass through an oven, wherein the step of curing the embossed polyurethane composition is performed in a second pass through the oven, and wherein the step of curing the layer of skid-resistant material is performed in a third pass through the oven.

20. The method of claim 19, wherein the plurality of discrete spaced male projections of the predetermined pattern comprises a plurality of raised serpentine bands.

21. The method of claim 1, wherein the cross-sectional surface area of the top surfaces of the plurality of discrete spaced male projections is at least 40% of the cross-sectional area of a bottom surface of the floor covering.

22. The method of claim 19, wherein the cross-sectional surface area of the top surfaces of the plurality of discrete spaced male projections is at least 40% of the cross-sectional area of a bottom surface of the floor covering.

23. The method of claim 19, wherein the oven is a triple-pass oven.

* * * * *